United States Patent [19]

Nicolaisen

[11] 3,965,245

[45] June 22, 1976

[54] METHOD FOR PREPARING ALKALI METAL ORTHOPHOSPHATES AND AMMONIA IN A SINGLE STEP

[75] Inventor: Bernard H. Nicolaisen, Houston, Tex.

[73] Assignee: Olin Corporation, New Haven, Conn.

[22] Filed: Dec. 30, 1974

[21] Appl. No.: 537,234

[52] U.S. Cl................................ 423/312; 423/356; 423/307
[51] Int. Cl.$^2$................ C01B 15/16; C01B 25/26; C01C 1/02
[58] Field of Search.................. 423/305, 307–313, 423/237, 238, 356, 357, 437, 438

[56] References Cited
UNITED STATES PATENTS

| | | | |
|---|---|---|---|
| 3,337,297 | 8/1967 | Cook et al. | 423/305 |
| 3,826,815 | 7/1974 | Mavrovic | 423/356 |

OTHER PUBLICATIONS

Millor, Comprehensive Treatise on Inorganic & Theoretical Chemistry, vol. 8, p. 163, 1928.

*Primary Examiner*—Oscar R. Vertiz
*Assistant Examiner*—Gregory A. Heller
*Attorney, Agent, or Firm*—Robert L. Andersen

[57] ABSTRACT

A selected ammonium phosphate is reacted at elevated temperature and pressure with sodium hydroxide in a vertical column having vapor-liquid contact means to produce an alkali metal orthophosphate having a low alkali metal/P molar ratio which is substantially free of ammonia. Ammonia is taken overhead.

19 Claims, 1 Drawing Figure

U.S. Patent   June 22, 1976   3,965,245
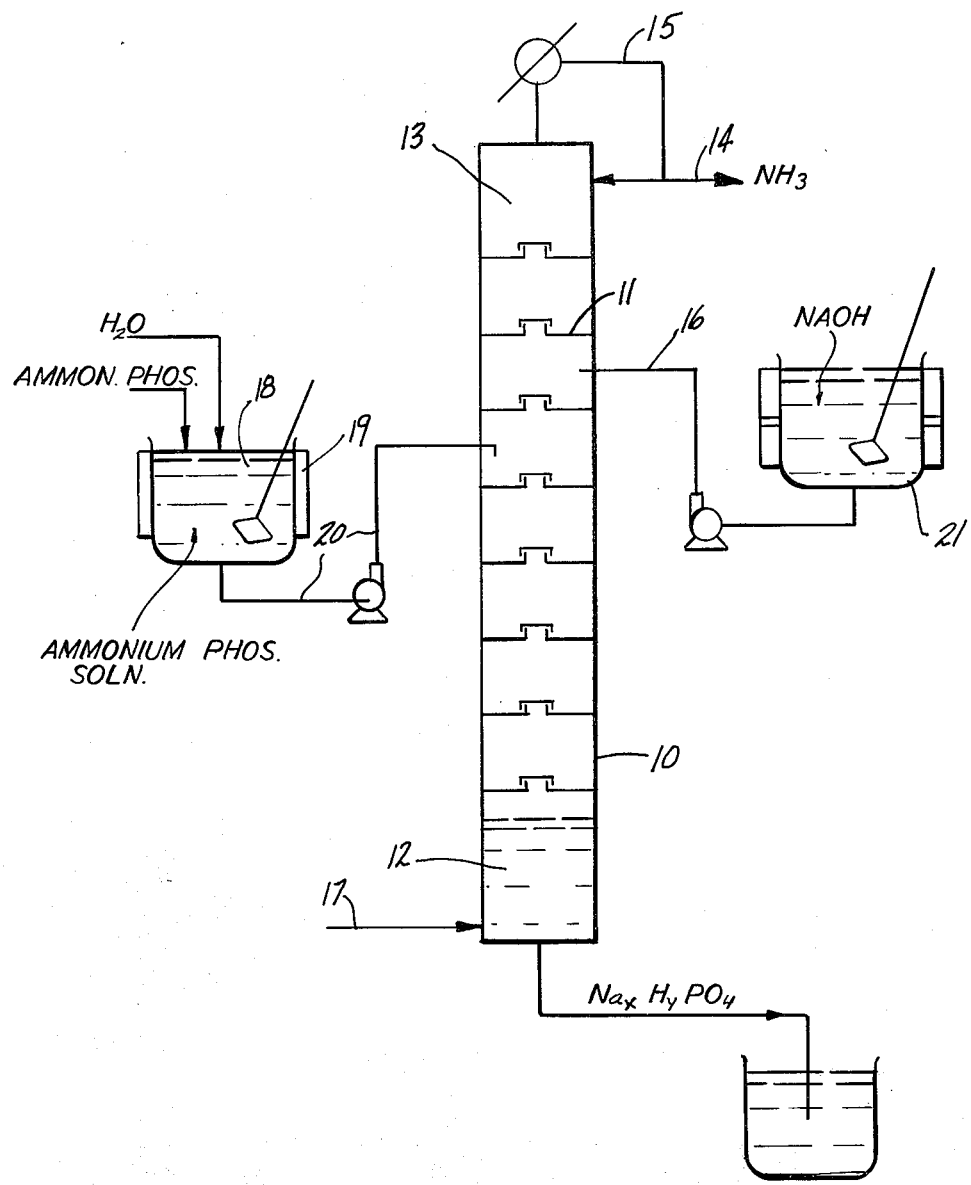

METHOD FOR PREPARING ALKALI METAL ORTHOPHOSPHATES AND AMMONIA IN A SINGLE STEP

BACKGROUND OF THE INVENTION

1. Field of the Invention

The present invention relates to a high temperature/high pressure process for preparing a solution of alkali metal phosphate from a selected ammonium phosphate while simultaneously recovering ammonia from the reaction mixture.

2. Description of the Prior Art

In the prior art, alkali metal phosphates such as monosodium phosphate, disodium phosphate, and trisodium phosphate, solutions thereof and compounds derived therefrom have been commercially prepared by neutralizing of furnace grade or wet process phosphoric acid at atmospheric pressure with an alkali metal hydroxide or carbonate such as sodium or potassium hydroxide or carbonate and then further treating the product to form a desired phosphate, polyphosphate, or pyrophosphate.

In such processes an ammonium phosphate is not formed as an intermediate for at least two reasons. Ammonia required for the preparation of an ammonium phosphate intermediate is costly and generally not readily available at the phosphate production site. Secondly, an economical process for utilizing a route involving an ammonium phosphate intermediate would require an efficient, inexpensive method for recovering ammonia for sale or recycle to the process and a suitable ammonia recovery process was not heretofore available.

It is generally known that the degree to which ammonia can be recovered from an aqueous system is a function of the alkalinity of the system. Thus, in the Kjeldahl method for analyzing for ammonia, highly alkaline solutions are employed in order to facilitate the release of ammonia. Likewise, in urea technology use of highly alkaline solutions facilitates substantially complete recovery of ammonia.

In aqueous phosphatic systems the ability to remove ammonia is also dependent on the alkalinity of the solution. Thus at atmospheric pressure complete recovery of ammonia from an ammonium phosphate solution is only feasible in the presence of a high concentration of a base such as sodium hydroxide, for example, in amounts sufficient to provide an Na/P molar ratio of 3 or more. As one decreases the concentration of base, recovery of ammonia becomes less complete and ammonia recovery times increase dramatically. As the Na/P molar ratio is decreased from 3 or more to about 2 or less ammonia recovery becomes uneconomical due to low yields and extended recovery time.

It is self-defeating to utilize a high Na/P molar ratio to facilitate ammonia recovery during alkali metal phosphate formation due to the fact that the high Na/P molar ratio merely limits the variety of phosphates which can be ultimately formed. For example, if an Na/P molar ratio of 2 or more is utilized to form an orthophosphate solution from an ammonium phosphate, the orthophosphate cannot advantageously be used to form such relatively acidic products as $NaH_2PO_4$, $Na_2H_2P_2O_7$ and $(NaPO_3)_x$ since each require an Na/P molar ratio of 1. Likewise, an orthophosphate solution having an Na/P molar ratio of 2 or more cannot advantageously be utilized as a source material for sodium tripolyphosphate which requires an Na/P molar ratio of about 1.667.

It is thus apparent that if substantially all ammonia could be recovered from relatively acidic ammonium phosphate solutions, for example, those having an alkali metal/P molar ratio below about 2 and preferably as low as about 1 the resulting orthophosphate could advantageously be employed to prepare all phosphates, polyphosphates, and pyrophosphates in which the ratio of alkali metal to P is 1 or more.

Thus, the principal object of the present invention is to provide a method for preparing from a selected ammonium phosphate an alkali metal orthophosphate solution which has a low alkali metal/P molar ratio and for simulteneously recovering the ammonia present in the starting ammonium phosphate.

It is also an object of the present invention to provide such a process in which substantially all such ammonia may be recovered, even at low alkali metal/P molar ratios.

It is a further object of the present invention to provide a process which is sufficiently versatile as to be capable of economically producing ammonia of any desired degree of purity and a solution of an alkali metal orthophosphate having any desired alkali metal/P molar ratio in the range of 1–2.

SUMMARY OF THE INVENTION

In accordance with the present invention, it has been found that one may prepare an aqueous alkali metal orthophosphate having a selected alkali metal/P molar ratio in the range of 1–2 and simultaneously recover substantially all ammonia by contacting a selected ammonium phosphate with sufficient alkali metal hydroxide to provide an aqueous reaction mixture having an alkali metal/P molar ratio in the range of 1–2, stripping ammonia from the reaction mixture at elevated temperature and pressure in a substantially vertical column having vapor-liquid contact means and separately recovering ammonia and an aqueous alkali metal orthophosphate which is substantially free of ammonia.

DETAILED DESCRIPTION

The accompanying drawing is a diagram showing a column suitable for use in the present invention and showing the flow of materials in accordance with the preferred embodiment thereof.

A suitable starting material for use in the present invention is a selected ammonium phosphate, which term, as used herein, is intended to include monoammonium phosphate $(NH_4)H_2PO_4$, or a monoalkali metal ammonium hydrogen phosphate (alkali metal ammonium phosphate) such as sodium ammonium phosphate, $Na(NH_4)HPO_4$. One may also employ as a suitable starting material any desired mixture thereof or an aqueous solution or slurry of said ammonium phosphate whose composition may be represented by the formula $Na_x(NH_4)_yH_zPO_4$ wherein $x$ is in the range of 0–1.5, $y$ is about 1 and $z$ is a value not less than zero equal to the value of $3 - (x + y)$.

The preparation of these starting materials is well known to those skilled in the art. For example, it is known that monoammonium phosphate may be prepared by ammoniating wet process or furnace grade phosphoric acid and crystallizing as taught, for example, in U.S. Pat. No. 3,388,966. Sodium ammonium phosphate is readily prepared as a solution or crystal by the reaction of monoammonium phosphate with caustic or by reacting phosphoric acid with ammonia and caustic as is known in the art.

The selected ammonium phosphate is dissolved or suspended in water in any known manner to form an aqueous ammonium phosphate of a desired concentration. Suitably any concentration may be employed, but a fairly concentrated solution of the ammonium phosphate is preferred in order to maximize productivity in the high pressure/temperature column which is hereinafter described. Accordingly, if a solution is employed it may contain anywhere from about 10 wt.% up to about 70 wt.% ammonium phosphate depending on the solubility of the ammonium phosphate selected and the temperature of the solution.

While it is preferable to use a concentrated solution of ammonium phosphate, a slurry of the ammonium phosphate may also be employed. The ability to utilize a slurry, however, will depend on the vapor-liquid contact means employed in the column. For example, if a slurry is utilized, it is preferable not to utilize a packed column due to the likelihood of plugging the column upon continuous operation. On the other hand, a slurry of the ammonium phosphate may advantageously be utilized even in a packed column if the ammonium phosphate concentration therein is such that it will dissolve when subjected to increased temperature and pressure in the tower.

The second starting material utilized in the present invention is a solution or slurry of an alkali metal hydroxide of any desired concentration. Preferably sodium or potassium hydroxide is employed.

The selected ammonium phosphate and alkali metal hydroxide may suitably be introduced to the column in several ways. In the preferred embodiment the ammonium phosphate and alkali metal hydroxide solutions are fed as separate feed streams to the column as shown in the drawing. Alternatively, the ammonium phosphate may be premixed with all or part of the alkali metal hydroxide prior to introduction into the column. If it is premixed with all of the alkali metal hydroxide a single feed stream may be utilized. If only part of the alkali metal hydroxide is premixed with the ammonium phosphate prior to introduction, the balance is introduced as a separate feed stream.

The preference for introducing the ammonium phosphate and the alkali metal hydroxide as separate feed streams is based on the increased productivity obtained when heated concentrated solutions of the ammonium phosphate are utilized as a feed. If an alkali metal hydroxide is provided in a pre-mixed, heated concentrated solution or slurry of ammonium phosphate, it may be necessary to reduce the amount of pre-heating to avoid losses of ammonia prior to introduction. This is particularly true as the alkali metal/P molar ratio in the premixed feed solution is increased to values approaching 2. Where the alkali metal/P molar ratio is held to lower values, for example, below about 1.5, losses of ammonia due to preheating are more readily controlled. However, the problem of ammonia losses may be eliminated entirely by utilizing separate feed streams and hence this is the preferred embodiment of the invention.

Referring now to the drawing there is shown a column 10 suitable for use in the present invention. A suitable column is one which is adapted for high temperature/high pressure operation preferably one which is made of a corrosion resistant material such as Hastalloy C. The column is substantially vertical and has a height substantially greater that its diameter, for example, in a ratio of from 10:1 to 250:1, the actual height depending on the type and efficiency of the vapor-liquid contact means used therein, the point of introduction and the results which are desired.

Suitable vapor-liquid contact means 11 are positioned throughout the reaction zone of the column and may include, for example, sieves, plates, beads, or packing as desired, all of which are well known in the art.

A typical column for laboratory demonstration of the process is one which is 2 inches in internal diameter by about 20 feet tall. As shown in the drawing, the tower is provided with vapor-liquid contact means throughout a major portion of its length. A small unpacked section 12 is left at the bottom of the tower for accumulation of a suitable level of the bottoms product and an ammonia rectification section 13 is left open in the top of the tower. The top of the tower is provided with a condenser/splitter for recovery and recycle of ammonia via lines 14 and 15 respectively.

The amount of packing or other vapor-liquid contact means above line 16 and the reflux ratio via line 15 will determine the ultimate purity of ammonia recovered via line 14 and this purity may be varied from anhydrous ammonia to agricultural grade ammonia as desired, a greater degree of purity being attained as the number of theoretical plates or the reflux ratio or both is increased.

The column 10 is designed for high pressure operation in order to attain the temperatures necessary to strip ammonia from the reaction mixture. It is preferable that substantially all ammonia be stripped from the reaction mixture to produce a bottoms product substantially free thereof. For purposes of the present invention the bottoms product is considered to be substantially free of ammonia if about 90–100%, desirably 95–100%, preferably 99–100% of the ammonia in the reaction mixture is removed. The column must be operable at a pressure of at least about 130 p.s.i.g. and preferably up to about 500 p.s.i.g. in order to attain this degree of ammonia removal. At lower pressures within this range, temperatures obtainable in the column will not permit complete removal of all ammonia present in the reaction mixture. However, the amount of ammonia removed at lower temperatures in the range may be substantially increased by supplying or increasing the supply of stripping gasses to the column, for example, through line 17.

Suitable stripping gasses include oxygen, air or nitrogen or other inert gasses which will not contaminate the ammonia recovered from the top of the tower or react with the reaction mixture. Carbon dioxide is preferably to be avoided since its presence tends to increase corrosion in the column, complicate ammonia recovery and contaminate the bottoms product. Oxygen or air is preferred since either or both tend to passivate the metal of the column against the corrosive effect of ammonia solutions therein.

As pressure in the column is increased, up to about 500 p.s.i.g., suitably 200–500 p.s.i.g., temperatures obtainable therein also increase thus increasing the efficiency of ammonia removal from the reaction mixture. At a pressure in the range of 300–500 p.s.i.g. ammonia content of the bottoms product is not more than about 1 ppm. Little, if any, advantage will be realized by utilizing pressures above about 400–500 p.s.i.g. although there is no technical reason why one could not do so.

Temperature in the column also affects the efficiency of ammonia removal. For most economical operation the column is operated at the boiling point of the reaction mixture at the selected pressure, and heat is provided by any known means, for example, by use of a bottom reboiler. By operating at this temperature water is split out of the reaction mixture and serves to act as a stripping agent for the ammonia. The ammonia is then rectified to any desired degree in the upper part of the column and water returned to the liquid phase. Supplemental stripping gas is generally not required, but in the event it is needed it may be supplied via line 17.

Alternatively an elevated temperature below the boiling point of the reaction mixture, suitably from 150°F. up to the boiling point, desirably 200°F. up to the boiling point, preferably 250°F. up to the boiling point may be employed if desired. Stripping gas is then preferably supplied via line 17 and serves as the vehicle for removal of ammonia from the mixture. The degree of ammonia removal will depend then in part on the volume of stripping gasses supplied and in part on the liquid temperature.

The alkalinity of the reaction mixture also plays a role in the degree to which ammonia is removed from the reaction mixture. At high alkali metal to phosphorus molar ratios ammonia is more readily removed than where the reaction mixture is more acidic. Increasing the alkali metal content, however, is not a commercially acceptable means for recovering the ammonia since, as indicated above, the high Na/P ratios in the reaction mixture merely limit the variety of phosphates which can be derived from the resulting product. It is far more desirable to operate at Na/P molar ratios in the range of 1–2, preferably 1–1.75, and simultaneously be able to remove substantially all, from 90 to 100% as desired, ammonia present in the reaction mixture. This can be achieved in accordance with the present invention even at an Na/P molar ratio as low as 1, whereas at atmospheric pressure less than about 40% of the available ammonia could be removed utilizing such a low ratio.

Referring again to the drawing the aqueous ammonium phosphate is preferably prepared and stored in vessel 18 which may be provided with heaters 19. The ammonium phosphate is transferred from vessel 18 and introduced to column 10 via line 20 preferably at an intermediate level to allow space above for ammonia rectification and disengagement. Preferably the ammonium phosphate is introduced continuously to provide continuous contact with the aqueous alkali metal hydroxide.

The alkali metal hydroxide is introduced, preferably continuously, into the column via line 16 from storage vessel 21 preferably at the same level or at a level above the level at which the ammonium phosphate is introduced but sufficiently below the top of the column to allow for rectification and disengagement of ammonia. Introducing the alkali metal hydroxide at the same level as the ammonium phosphate will facilitate maximum co-current contact in the column and thus maximize effectiveness of the column in stripping ammonia. Premixing the ammonium phosphate and the alkali metal hydroxide and utilizing a single feed stream will have substantially the same effect except that preintroduction temperature may have to be controlled to avoid pre-injection ammonia losses. Less advantageously the alkali metal hydroxide may be injected at a level below the level of introduction of the ammonium phosphate. This method for introducing the reagents is less efficient in that a portion of the column is not available for ammonia stripping. Also it is not recommended where either feed stream contains carbon dioxide, carbonates, or bicarbonates. Absent the presence of carbon dioxide, carbonates, or bicarbonates, however, this method is only slightly less efficient than the preferred embodiments and is, therefore, to be considered as within the spirit and scope of the invention.

The alkali metal hydroxide and ammonium phosphate solutions are each permitted to flow gravitationally downward into co-current contact to form an aqueous reaction mixture and to react to form a solution of alkali metal orthophosphate having an alkali metal, preferably sodium or potassium, to phosphorus molar ratio in the range of 1–2, this ratio being determined by the rate at which the ammonium phosphate and alkali metal hydroxide are introduced. If one were to view the reaction mixture as a whole, including all ammonia present in the feed streams, one would find that its overall composition in the column could be represented by the formula $M_x(NH_4)_yH_zPO_4$ wherein M is an alkali metal, preferably sodium or potassium, $x$ is a value in the range of 1–2, $y$ is about 1, representing substantially all ammonia in the ammonium phosphate feed stream, and $z$ is a value not less than zero equal to the value of the expression $3 - (x + y)$.

During the reaction and thereafter as the reaction mixture flows downward toward the bottom of the tower, ammonia is released and flows countercurrently to the top of the tower together with water vapor and/or any stripping gasses which have been supplied via line 17. As the ammonia rises in the tower water vapor may be removed to any desired degree in the vapor-liquid contact zone above line 16 by increasing or decreasing the number of theoretical plates above line 16, or by increasing the reflux ratio via line 15. The ammonia is recovered via line 14.

The bottoms product comprises an aqueous solution of alkali metal orthophosphate having an alkali metal/P molar ratio in the range of 1–2 corresponding to the ratio at which the ammonium phosphate and alkali metal hydroxide are introduced to the column. The composition of the product may be represented by the formula $Na_xH_yPO_4$ wherein $x$ is a value in the range of 1–2 and $y$ is a value not less than zero equal to $3 - x$. At least 90 to 100%, desirably 95–100%, and preferably 99–100% of available ammonia will have been removed and simultaneously recovered as a separate overhead product.

In a most preferred embodiment, the bottoms product will have an alkali metal/P molar ratio in the range of about 1 to about 1.3 and thus serve as a source material for monosodium phosphate as well as all other phosphates, polyphosphates and pyrophosphates.

It is apparent that if sodium ammonium phosphate is used as the starting material, the alkali Na/P molar ratio is already at a value of 1. Accordingly, if one desires to operate the column at a ratio of 1, sodium ammonium phosphate solution may be utilized as the feed stream and little or no additional sodium hydroxide is required. It is also apparent that if one chooses to start with monoammonium phosphate, one mole of sodium hydroxide may be premixed therewith to obtain a single feed stream having a composition corresponding substantially to the use of sodium ammonium phosphate. Thus, if sodium ammonium phosphate is to be fed to the column it may be either a solution prepared from crystalline sodium ammonium phosphate or a solution prepared by the reaction of crystalline monoammonium phosphate with sodium hydroxide, and, depending on the desired operating ratio, one may choose to operate with minute quantities or no additional sodium hydroxide.

EXAMPLE I

A solution comprising 30 wt.% monoammonium phosphate at 27°C. was introduced into a 2-inch by 20-foot vertical column at a level of about 10 feet at a rate of 50 cc per minute. The column bottom temperature was between 385°–450°F. and the column top temperature was 110°–145°F. A 50% caustic solution was introduced at a level at 12 feet above the bottom of the tower at a rate of 13.4 cc per minute. The tower was maintained at a pressure of 400 p.s.i.g., and was packed with ¼ inch Pro-pack packing of 316 mesh stainless steel, the total packing being equal to about 120 theoretical plates. The overhead product was anhydrous ammonia. The bottoms product had an Na/P molar ratio of 1.67 and had an ammonia content of less than 1 ppm.

EXAMPLE II

A 2-inch by 20-foot column packed with ¼ inch Pro-pack packing made of 316 mesh stainless steel was utilized with about 2 inches of packing to a theoretical plate. The column was estimated to have about 120 theoretical plates. The column was equipped with a ½ foot overhead condenser, reflux splitter and bottom reboiler. The tower was maintained at a pressure of 400 p.s.i.g. at a column bottom temperature of between 385°F. and 449°F. and a column top temperature between 110°F. and 145°F.

A 35 wt.% solution of sodium ammonium phosphate was introduced at flow rates varying from 40 to 85 cc per minute at a level of 10 feet above the bottom of the tower. A 49% caustic solution was introduced at 5 cc per minute at a level of 12 feet from the bottom of the tower. Liquid product had an Na/P molar ratio varying from 1.37 to 1.77 and was found to have an ammonia content varying from less than 1 up to 3 ppm regardless of the Na/P molar ratio utilized.

I claim:

1. A process for preparing a substantially ammonia-free solution of alkali metal orthophosphate and simultaneously recovering ammonia comprising:
   a. contacting a selected ammonium phosphate with sufficient alkali metal hydroxide to provide an aqueous reaction mixture having a desired alkali metal/P molar ratio in the range of 1–2,
   b. passing said reaction mixture downward in countercurrent contact with ammonia and inert stripping gases at elevated temperature and at a pressure in the range of 130–500 p.s.i.g. in a substantially vertical column having vapor-liquid contact means,
   c. withdrawing from said column an overhead product comprising said ammonia and separately withdrawing therefrom a bottoms product comprising an aqueous solution of alkali metal orthophosphate having said alkali metal/P molar ratio and being substantially free of ammonia.

2. The process of claim 1 wherein said ammonium phosphate is selected from the group consisting of monoammonium phosphate, monoalkali metal ammonium phosphate and mixtures thereof.

3. The process of claim 1 wherein said alkali metal hydroxide is sodium hydroxide.

4. The process of claim 1 wherein said elevated temperature is in the range of 150°F. up to the boiling point of the reaction mixture.

5. The process of claim 4 wherein said temperature is in the range of 250°F. up to the boiling point of the reaction mixture.

6. The process of claim 1 wherein the alkali metal/P molar ratio of said reaction mixture is in the range of 1 to 1.75.

7. The process of claim 1 wherein said pressure is in the range of 200 to 500 p.s.i.g.

8. The process of claim 1 wherein said ammonium phosphate is selected from the group consisting of monoammonium phosphate, sodium ammonium phosphate and mixtures thereof, said alkali metal hydroxide is sodium hydroxide, said temperature is in the range of 250°F. up to the boiling point of the reaction mixture and said pressure is in the range of 300 to 500 p.s.i.g.

9. The process of claim 8 wherein substantially anhydrous ammonia is recovered as an overhead product.

10. A process for preparing a substantially ammonia-free solution of alkali metal orthophosphate and simultaneously recovering ammonia comprising:
    a. introducing a selected aqueous ammonium phosphate into a substantially vertical column having vapor-liquid contact means and maintained at elevated temperature and at a pressure in the range of 130–500 p.s.i.g.,
    b. introducing an aqueous alkali metal hydroxide into said column at a rate sufficient to provide therein a desired alkali metal/P molar ratio in the range of 1–2,
    c. permitting said alkali metal hydroxide and said ammonium phosphate to flow downwardly in said column in co-current contact to form a reaction mixture having said alkali metal/P molar ratio,
    d. stripping ammonia from said reaction mixture, and
    e. withdrawing from said column an overhead product comprising said ammonia and separately withdrawing therefrom a bottoms product comprising a solution of alkali metal orthophosphate having said alkali metal/P molar ratio and being substantially free of ammonia.

11. The process of claim 10 wherein said ammonium phosphate is selected from the group consisting of monoammonium phosphate, alkali metal ammonium phosphate and mixtures thereof.

12. The process of claim 10 wherein said alkali metal hydroxide is sodium hydroxide.

13. The process of claim 10 wherein said elevated temperature is in the range of 150°F. up to the boiling point of the reaction mixture.

14. The process of claim 10 wherein the alkali metal/P molar ratio of said reaction mixture is in the range of 1 to 1.75.

15. The process of claim 10 wherein said pressure is in the range of 200–500 p.s.i.g.

16. The process of claim 10 wherein said alkali metal hydroxide and said ammonium phosphate are each introduced into said column at an intermediate level.

17. The process of claim 16 wherein said alkali metal hydroxide is introduced at the same level or above a level at which said ammonium phosphate is introduced into said column.

18. The process of claim 17 wherein said ammonium phosphate is selected from the group consisting of monoammonium phosphate, sodium ammonium phosphate and mixtures thereof, said alkali metal hydroxide is sodium hydroxide, said temperature is in the range of 250°F. up to the boiling point of said reaction mixture and said pressure is in the range of 300–500 p.s.i.g.

19. The process of claim 17 wherein said ammonia is recovered as substantially anhydrous ammonia.

\* \* \* \* \*